United States Patent
Samie et al.

(10) Patent No.: US 8,622,186 B2
(45) Date of Patent: Jan. 7, 2014

(54) METHOD OF OPERATION OF A SELECTABLE ONE WAY CLUTCH SELECTION MECHANISM

(75) Inventors: Farzad Samie, Franklin, MI (US); Andrew L. Bartos, Clarkston, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 329 days.

(21) Appl. No.: 12/959,492

(22) Filed: Dec. 3, 2010

(65) Prior Publication Data

US 2012/0138411 A1    Jun. 7, 2012

(51) Int. Cl.
    *F16D 25/08*    (2006.01)
    *F16D 43/28*    (2006.01)

(52) U.S. Cl.
    USPC ........................................ 192/85.48; 192/43.1

(58) Field of Classification Search
    USPC .............. 192/85.1, 43.1, 69.1, 85.48, 43
    See application file for complete search history.

(56) References Cited

U.S. PATENT DOCUMENTS

| 2,700,444 | A | * | 1/1955 | Ahlen | 192/93 R |
| 5,927,455 | A | * | 7/1999 | Baker et al. | 192/36 |
| 8,051,959 | B2 | * | 11/2011 | Eisengruber | 188/82.3 |
| 2008/0000747 | A1 | * | 1/2008 | Saka | 192/43.2 |
| 2009/0084653 | A1 | | 4/2009 | Holmes | |
| 2010/0063693 | A1 | | 3/2010 | Lee | |
| 2010/0063698 | A1 | * | 3/2010 | Lee et al. | 701/67 |

FOREIGN PATENT DOCUMENTS

WO    2010 011 480 A2    1/2010

OTHER PUBLICATIONS

U.S. Appl. No. 12/206,841, Chunhao Lee.
U.S. Appl. No. 12/206,847, Chunhao Lee.
U.S. Appl. No. 12/206,854, Chunhao Lee.
U.S. Appl. No. 12/501,603, Hong Yang.
U.S. Appl. No. 12/632,885, Farzad Samie.

* cited by examiner

*Primary Examiner* — David D Le
*Assistant Examiner* — Stacey Fluhart (57) ABSTRACT

Apparatus for controlling a selectable one-way clutch (SOWC) in an automatic transmission includes a ring-shaped control housing located substantially concentrically to the SOWC, and an actuation mechanism included within the ring-shaped control housing and effective to actuate a selector plate engaged with the SOWC from a default position to an actuation position. The selector plate is located between the ring-shaped control housing and the SOWC. A hydraulic fluid delivery system hydraulically communicates with the actuation mechanism to control the actuation of the actuation mechanism.

14 Claims, 5 Drawing Sheets

METHOD OF OPERATION OF A SELECTABLE ONE WAY CLUTCH SELECTION MECHANISM

TECHNICAL FIELD

This disclosure is related to clutch engagement of a selectable one-way clutch.

BACKGROUND

The statements in this section merely provide background information related to the present disclosure and may not constitute prior art.

A selectable one-way clutch (SOWC) is capable of producing a mechanical connection between a driving and a driven member in one or both rotational directions, i.e., forward and reverse. Also, depending on the design, an SOWC is capable of overrunning, i.e., freewheeling, in one or both directions of rotation. A SOWC includes an externally controllable selection mechanism that when moved to a second, and possibly even a third position, controls the operating modes of the device. An SOWC reduces the part complexity of the transmission, reduces weight and cost of the transmission, and reduces overall spin losses.

The ability of the driving member of a SOWC to transmit torque to a driven member depends on whether or not the engaging torque transmitting elements of the SOWC, typically rollers, sprags, rockers, or struts, etc., are able to freely engage one or more cams, notches, recesses, or similar features in the adjacent member. Similarly, the ability of the driving member to overrun in one or both directions with respect to the driven member also depends on whether or not the engaging elements are free to interact with the adjacent member. A rotatable retainer ring or selector plate can be used to accomplish this task by allowing or restricting engagement of the torque transmitting elements between the driving and the driven member. Other similar clutch designs are known in the art and capable of use as one-way clutching devices, including synchronizers and dog clutches.

SUMMARY

Apparatus for controlling a selectable one-way clutch (SOWC) in an automatic transmission includes a ring-shaped control housing located substantially concentrically to the SOWC, and an actuation mechanism included within the ring-shaped control housing and effective to actuate a selector plate engaged with the SOWC from a default position to an actuation position. The selector plate is located between the ring-shaped control housing and the SOWC. A hydraulic fluid delivery system hydraulically communicates with the actuation mechanism to control the actuation of the actuation mechanism.

BRIEF DESCRIPTION OF THE DRAWINGS

One or more embodiments will now be described, by way of example, with reference to the accompanying drawings, in which:

FIGS. 4-1 and 4-2 are partial sectional views of the SOWC depicting one set of forward locking members and rearward locking members during operation of the SOWC in the default and actuation positions, respectively, in accordance with the present disclosure.

DETAILED DESCRIPTION

Figure 1:
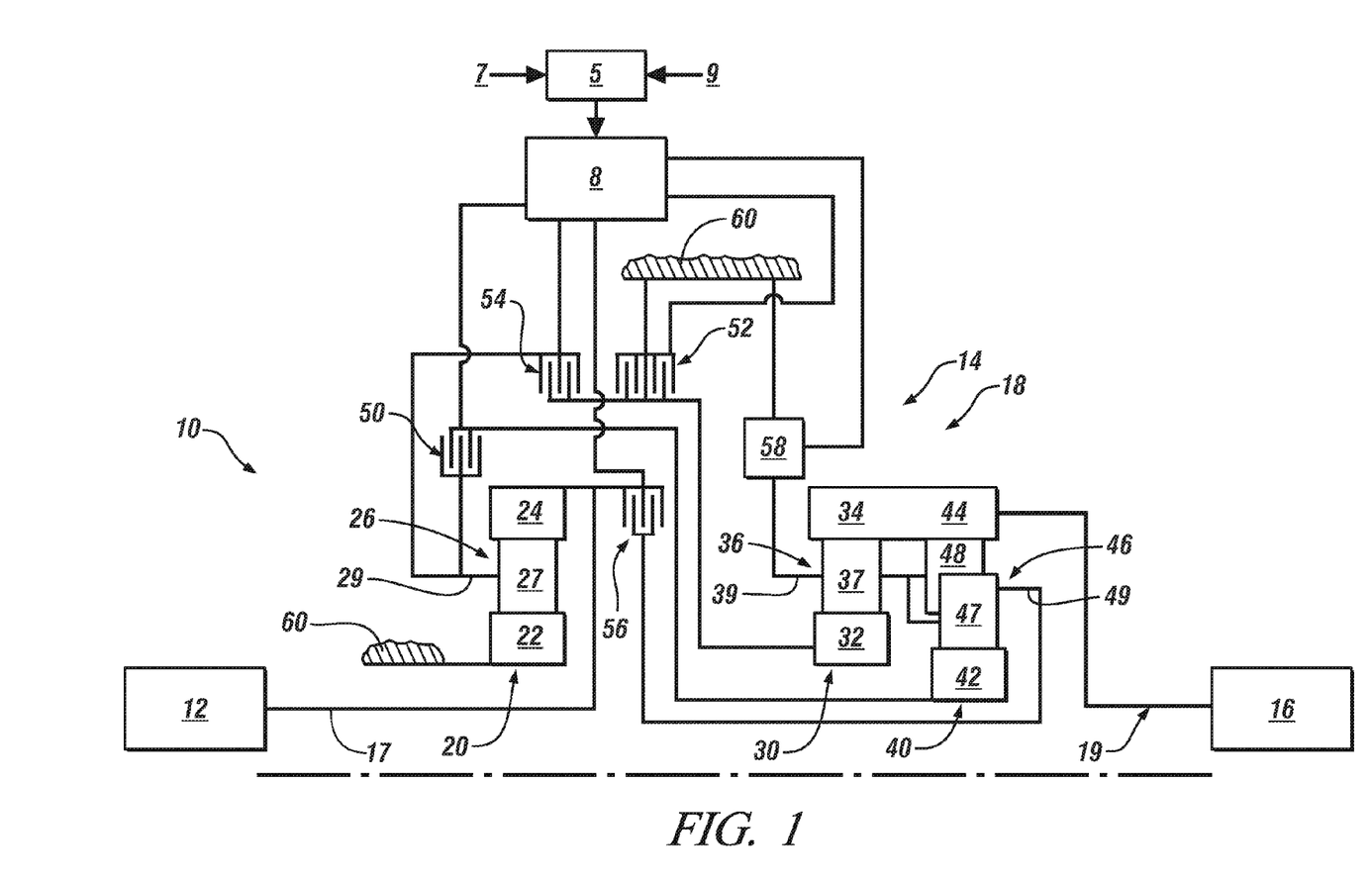
FIG. 1 illustrates a schematic diagram of an exemplary powertrain, in accordance with the present disclosure.

Referring now to the drawings, wherein the showings are for the purpose of illustrating certain exemplary embodiments only and not for the purpose of limiting the same, FIG. 1 illustrates an exemplary powertrain 10 including an engine 12, a planetary transmission 14, and a differential 16.

The planetary transmission 14 includes an input shaft 17 continuously connected with the engine 12, a planetary gear arrangement 18, and an output shaft 19 continuously connected with the differential 16. A torque converter can be positioned between the engine 12 and the input shaft 17. If no torque converter is present, then an isolator can be positioned between the engine 12 and the input shaft 17. The planetary gear arrangement 18 includes three planetary gear sets; a first planetary gear set 20, a second planetary gear set 30, and a third planetary gear set 40.

The first planetary gear set 20 includes a sun gear member 22, a ring gear member 24, and a planet carrier assembly member 26. The planet carrier assembly member 26 includes a plurality of pinion gears 27 rotatably mounted on a carrier member 29 and engaged via splines with both the sun gear member 22 and the ring gear member 24.

The second planetary gear set 30 includes a sun gear member 32, a ring gear member 34, and a planet carrier assembly member 36. The planet carrier assembly member 36 includes a plurality of pinion gears 37 rotatably mounted on a carrier member 39 and engaged via splines with both the sun gear member 32 and the ring member 34.

The third planetary gear set 40 includes a sun gear member 42, a ring gear member 44, and a planet carrier assembly member 46. The planet carrier assembly member 46 includes a plurality of pinion gears 47, 48 rotatably mounted on a carrier member 49. The pinion gears 47 are engaged via splines with the sun gear member 42, and the pinion gears 48 are engaged via splines with the ring gear member 44. The ring gear member 34 is integral with the ring gear member 44. The third planetary gear set 40 is a compound planetary gear set.

The planetary gear arrangement also includes five selectable torque transmitting mechanisms 50, 52, 54, 56, and 58. The torque transmitting mechanisms 50, 54, 56 are rotating type torque transmitting mechanisms, commonly termed clutches. Clutches 50, 54, and 56 are commonly multi-plate clutch devices, for example, in a friction launch configuration. The torque transmitting mechanism 52 is a stationary type torque transmitting mechanism, commonly termed brake or reaction clutch. The torque transmitting mechanism 58 is a selectable one-way clutch (SOWC). The SOWC 58 may be a controllable mechanical diode clutch, a selectable roller clutch, or selectable sprag clutch design. The disclosure contemplates that other selectable (reversible) one-way clutches could be used as defined herein with the present disclosure.

The input shaft 17 is continuously connected with the ring gear member 24 and the output shaft 19 is continuously connected with the ring gear member 44. The planet carrier assembly member 26 is selectively connectable with the sun gear member 42 through the clutch 50. The sun gear member 32 is selectively connectable with a transmission housing 60 through the brake 52. The planet carrier assembly member 26 is selectively connectable with the sun gear member 32 through the clutch 54. The ring gear member 24 is selectively connectable with the planet carrier assembly member 46 through the clutch 56. The planet carrier assembly member 36 is selectively connectable with the transmission housing 60 through the SOWC 58.

The transmission 14 includes a series of fluid circuits, such as channels within the transmission housing 60 and tubes outside of the transmission housing 60, for routing fluid to appropriate areas of the transmission 14. The fluid circuits supply hydraulic pressure to selectively operate the torque transmitting mechanisms 50, 52, 54, 56, and 58, i.e., the fluid is capable of activating and deactivating each of the torque transmitting mechanisms 50, 52, 54, 56, and 58 independently. A hydraulic fluid delivery system 8, commonly referred to as a valve body, is signally connected to a control module 5 to selectively open and close a number of valves to provide selectable fluid flow into the desired fluid circuit(s) to activate and deactivate the individual torque transmitting mechanisms 50, 52, 54, 56, and 58 to create the commanded outcome, e.g., an appropriate torque multiplication or reduction.

The transmission control module 5 is signally connected to operate the valve body 8 and therefore the torque transmitting mechanisms 50, 52, 54, 56, and 58. The control module 5 receives an operator torque request 7 and vehicle operating parameters 9, e.g., current engine torque output, wheel speed sensor output, and gear selection, to select appropriate torque transmitting mechanisms 50, 52, 54, 56, and 58 to achieve a selected gear ratio for vehicle operation. The selected gear ratio can be selected from a series of look-up tables or computed based on operator torque request 7 and current vehicle operating parameters 9. The control module 5 selects an appropriate amount of slip to provide smooth operation during gear transitions when one is commanded.

Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module 5 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
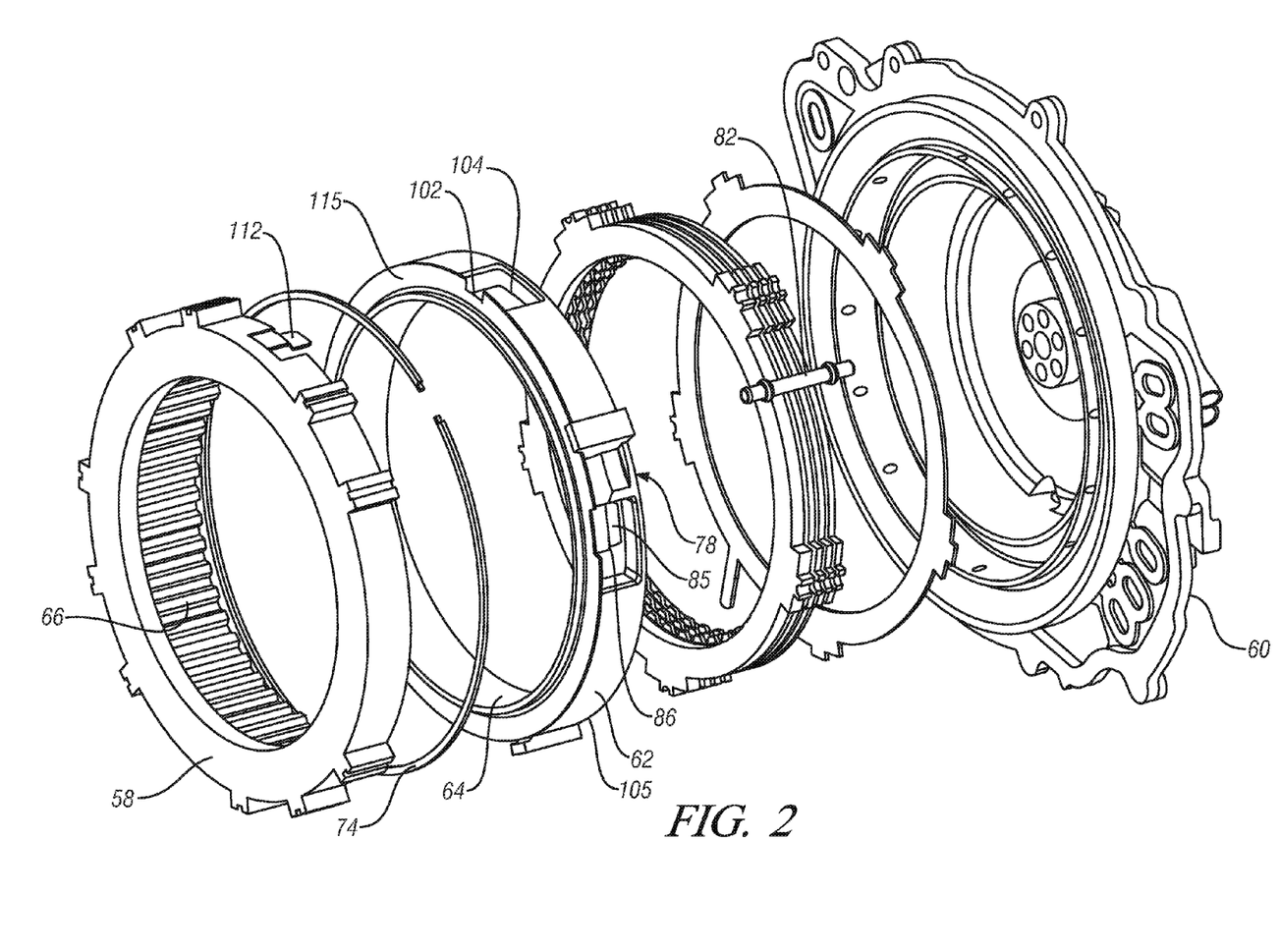
FIG. 2 is a disassembled view of an SOWC including a control housing, selector plate, and an actuation mechanism for controlling the operation of the SOWC, in accordance with the present disclosure.

FIG. 2 illustrates the SOWC 58 in relation to components assembled within the transmission housing 60 including a control housing 105, selector plate 115, actuation mechanism 78. The control housing 105 is a generally circular ring shaped device with an outer mechanism portion 62 and an opposed inner portion 64. When assembled, the inner portion 64 accepts a portion of the SOWC 58 and an SOWC inner surface 66 that can be used as a ring gear. It will be appreciated by one of ordinary skill in the art that the SOWC 58 and the control housing 105 are cylindrical and shaped to replace exemplary existing hydraulically actuated friction clutch designs within the same space constraints of the transmission housing 60. Utilizing the SOWC 58 within the transmission housing 60 can be beneficially accomplished by fitting the SOWC 58 into a preexisting design for a cylindrical clutch as disclosed herein.

The outer mechanism portion 62 houses the actuation mechanism 78 and return mechanism, as will be explained in detail with reference to FIG. 3. The actuation mechanism 78 engages and actuates the selector plate 115 though an actuation member 86. A fluid feed tube 82 fluidly connects the transmission housing 60 to the control housing 105 for providing pressurized fluid to the actuation mechanism 78. The control housing 105 includes an actuation recess 85 for providing an area in which the actuation member 86 can move.

The selector plate 115 is positioned between the control housing 105 and the SOWC 58. The selector plate 115 includes the actuation member 86 and an activation notch 102. The activation notch 102 is of a size to accept an actuation lever 112 from the SOWC 58. The control housing 105 includes an SOWC recess 104 for accepting the actuation lever 112. A snap ring 74 holds the SOWC 58 in the transmission housing 60.

Figure 3:
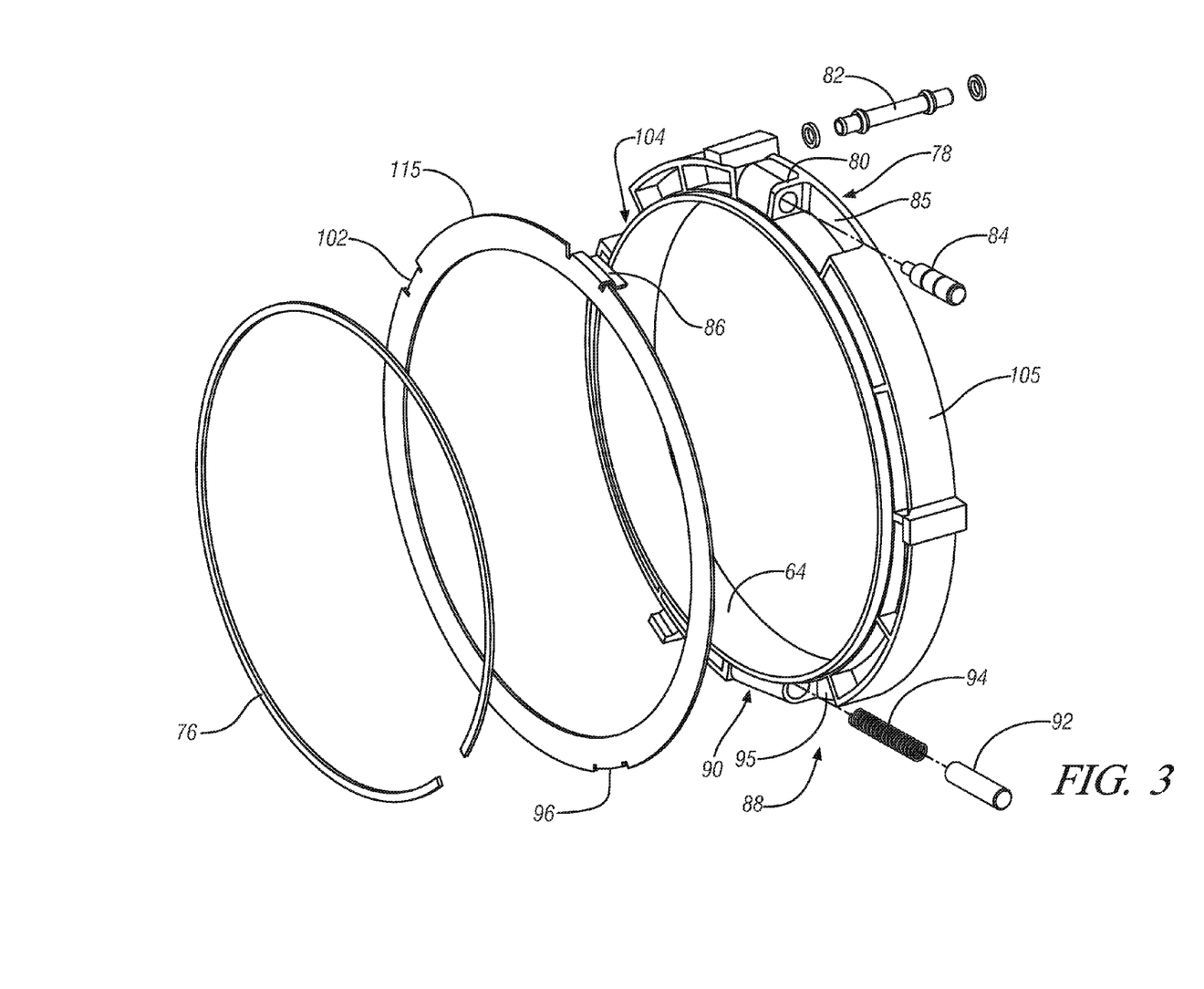
FIG. 3 is a disassembled view of the control housing, the selector plate, the actuation mechanism, snap ring, and a return mechanism, in accordance with the present disclosure.

FIG. 3 illustrates the control housing 105, the selector plate 115, the actuation mechanism 78, snap ring 76, and a return mechanism 88. The actuation mechanism 78 includes a piston housing 80, fluid feed tube 82, and actuation piston 84. The fluid feed tube 82 fluidly connects the transmission housing 60 to the control housing 105 for selectively providing pressurized fluid from the valve body 8 to the piston housing 80 through hydraulic circuits. It will be apparent the fluid feed tube 82 can be unitary with the transmission housing and the control housing 105. The piston housing 80 includes a wall shared with the actuation recess 85 whereat the actuation piston 84 is extendable therefrom. The actuation piston 84 is extendable from a retracted default position within the piston housing 80 to an extended actuation position that extends into the actuation recess 85 when an appropriate amount of fluid pressure is supplied.

The selector plate 115 is positioned between the control housing 105 and the SOWC 58 and is capable of rotational movement in relation to the control housing 105 thereby rotating the SOWC 58 from the default position to the actuation position. The actuation member 86 is engaged by the actuation piston 84 and resides in the actuation recess 85. The actuation recess 85 can act as a stop at an opposing wall from the piston housing 80.

The SOWC 58 extends into the inner portion 64 of the control housing 105 when assembled. It will be obvious to one of ordinary skill in the art that the SOWC 58 is positioned within transmission housing 60 in place of a conventional friction clutch.

A snap ring 76 secures the selector plate 115 to the control housing 105 and allows for rotation of the selector plate 115 in relation to the control housing 105 and the SOWC 58 when assembled therein. The return mechanism 88 is distally located from the actuation mechanism 78 and includes a return piston housing 90 for housing a return piston 92 and a biasing member 94, e.g., a coil spring, a leaf spring, or other biasing member that is capable of extending the return piston 92 from a retracted position within the return piston housing 90. The control housing 105 includes a return recess 95 having a shared wall with the return mechanism 88. The return piston 92 acts upon a return member 96 that is a portion of the selector plate 115 for returning the selector plate 115 to the default position when hydraulic pressure is reduced from the piston housing 80. The return recess 95 can act as a stop at an opposing wall from the return piston housing 90.

As depicted in FIG. 2, the SOWC 58 includes an actuation lever 112. Selector plate 115 of FIG. 3 includes an activation notch 102 configured to accept actuation lever 112. FIG. 3 additionally depicts an SOWC recess 104 located on the control housing 105 also for accepting actuation lever 112. The activation notch 102 is approximately the same width as the actuation lever 112 to transmit movement of the selector plate 115 to the actuation lever 112. The actuation lever 112 controls the engagement of the SOWC 58 in one of the default and actuation positions through rotation of a member selector ring, as will be discussed in relation to FIGS. 4-1 and 4-2. The default position is a forward drive position, i.e., the SOWC 58 is locked to provide acceleration torque from the engine 10 and allowing slip in the opposite direction, e.g., during coasting and deceleration. The actuation position is a locked position that transmits drivetrain rotation through the SOWC 58 in both acceleration and deceleration directions.

Figure 41:
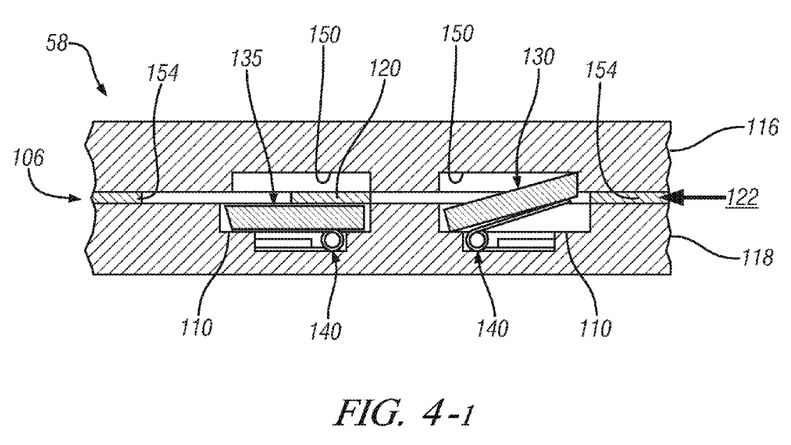
Figure 42:
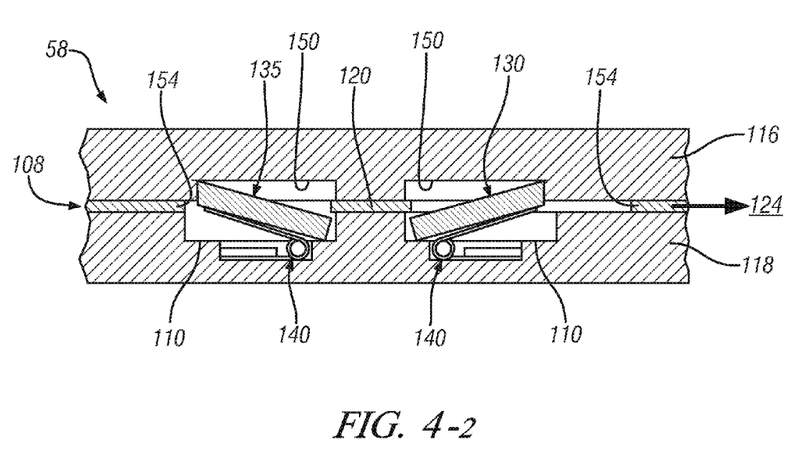

FIGS. 4-1 and 4-2 depict one set of forward locking members 130 and rearward locking members 135 during operation of an exemplary SOWC 58 in the default and actuation positions 106, 108 respectively. A method is depicted for controlling the position of member selector ring 154 in an exemplary two mode SOWC 58 using the actuation mechanism 78 and return mechanism 88 that is an integral part of the control housing 105 in an exemplary front wheel drive transmission. There are multiple sets of forward and rearward locking members 130, 135 respectively, around the diameter of the SOWC 58 that the member selector ring 154 engages. It will be apparent to one of ordinary skill in the art the number of sets of forward and rearward locking members 130, 135 respectively, can be variable depending on torque requirements for a specific application.

The member selector ring 154 is a generally ring shaped device slidably located between an outer casing 116 and an inner casing 118 of the SOWC 58. The member selector ring 154 is integral to the actuation lever 112 such that the member selector ring 154 is moveable when the actuation lever 112 is moved. The outer and inner casings 116 and 118, respectively, are able to rotate independently of each other. The inner casing 118 includes a plurality of recesses 110 capable of housing the forward locking member 130 and a rearward locking member 135 with each having a respective biasing member 140. The biasing member 140 can be a torsion spring, a coil spring, constant force spring, or another spring that is capable of providing lift to one side of the forward and rearward locking members 130, 135. The outer casing 106 includes a plurality of opposing recesses 150 capable of accepting one side of the forward locking member 130 and one side of the rearward locking member 135.

More specifically, FIG. 4-1 depicts the member selector ring 154 in the default position 106. According to an exemplary embodiment, the default position 106 is actuated when actuation mechanism 78 has low pressure. The return mechanism 88 rotates the selector plate 115 via the return piston 92 by providing force at the return member 96 to overcome low pressure in actuation mechanism 78. The selector plate 115 rotates in the direction of arrow 122 thereby causing the actuation lever 112 to rotate. The actuation lever 112 moves the member selector ring 154 to engage the rearward locking member 135 with a member selector actuator 120. The member selector actuator 120 overcomes the force of the biasing member 140 thereby causing the rearward locking member 135 to disengage the opposing recess 150 and nestle into its associated recess 110. The member selector actuator 120 remains over the rearward locking member 135 to retain the rearward locking member 135 within the recess 110 creating a partially engaged SOWC 58.

The outer casing 116 has the forward locking member 130 engaged in the opposing recess 150 to transfer the rotational motion between the outer casing 116 and the inner casing 118 when the inner casing is rotated in the direction of the forward locking member 130, i.e., opposite of arrow 122. The rotation of the inner casing 118 in the direction of the forward locking member 130 causes the rotational motion to be transferred to the outer casing 116 through the forward locking member 130.

The inner casing 118 is allowed to free wheel in relation to the outer casing 116 in the direction of the rearward locking member 135, i.e., in the direction of arrow 122, since the rearward locking member 135 is depressed into the recess 110. The forward locking member 130 is depressed by the outer casing 116 into its associated recess as the relative movement of the outer casing 116 to the inner casing 118 creates enough force to overcome the biasing member 140. Therefore the inner casing 118 is free to rotate in the direction of arrow 122 without engaging the outer casing 118 and thereby creates a neutral transmission state while in a forward driving gear during a deceleration event.

FIG. 4-2 depicts the member selector ring 154 in the actuation position 108. According to an exemplary embodiment, the actuation position 108 occurs when the actuation mechanism 78 has been provided with pressurized hydraulic fluid. The actuation piston 84 engages the actuation member 86. The actuation piston 84 is provided enough force to overcome the resistance of the biasing member 94 within the return mechanism 88 thereby rotating the member selector ring 154 in direction of arrow 124. The member selector actuator 120 rotates to an intermediate position between the forward locking member 130 and the rearward locking member 135. Upon reaching the intermediate position, the rearward locking member 135 can pivot and biasing member 140 biases the rearward locking member 135 into the associated opposing recess 150.

With both the forward locking member 130 and the rearward locking member 135 engaged in respective opposing recesses 150, the outer casing 116 and the inner casing 118 are locked in relation to one another, i.e., the SOWC 58 is fully engaged. Therefore, when the actuation position 108 is activated, the inner casing 118 provides direct transfer of rotational forces in both the direction of and opposite of arrow 124 thereby enabling torque transfer in a forward gear, a reverse gear, and during deceleration, in the form of engine braking, which is commonly known in the art.

In exemplary operation, an automatic control mode is used and the SOWC 58 is in the actuation position, the SOWC 58 can remain fully engaged so long as the speed and gear settings allow. An exemplary SOWC 58 can remain fully engaged continuously through operation, e.g., in parked, reverse, neutral, and first gear operation. For example, when a transmission 14 is shifted from park to reverse or to neutral, the SOWC 58 stays fully engaged with both the forward and rearward locking members 130, 135, respectively, to prepare for operation in the reverse gear. If the transmission 14 stays in the reverse gear, the SOWC 58 remains fully engaged.

When a driver shifts the transmission into a drive gear, the SOWC 58 can stay fully engaged until the vehicle picks up speed in excess of a threshold speed. The threshold speed can be, for example, a predetermined threshold speed, determined from look-up tables, and calculated based upon vehicle operating conditions. Once the SOWC 58 exceeds the threshold speed, the default position is selected and the SOWC 58 becomes partially engaged. The SOWC 58 remains in the default position to act as a regular one-way clutch so long as the vehicle remains above the threshold low speed range. Additionally, a manual mode may be operator selected by engaging certain operational modes, e.g., a competitive/sport mode or a low gear is selected, the SOWC 58 may stay in the actuation position throughout the entire operation range, regardless of vehicle speed to allow for engine braking during deceleration in each forward gear.

Therefore operation of the SOWC 58 in an automatic transmission occurs by monitoring the operational mode of the SOWC 58 that is actuated between the default position 106 and the actuation position 108. The valve body provides hydraulic fluid to the actuation mechanism housed within the control housing to actuate the selector plate. The selector plate is engaged with the SOWC 58 through the actuation member to select operation of the SOWC 58 between the default position and the actuation position.

Figure 5:
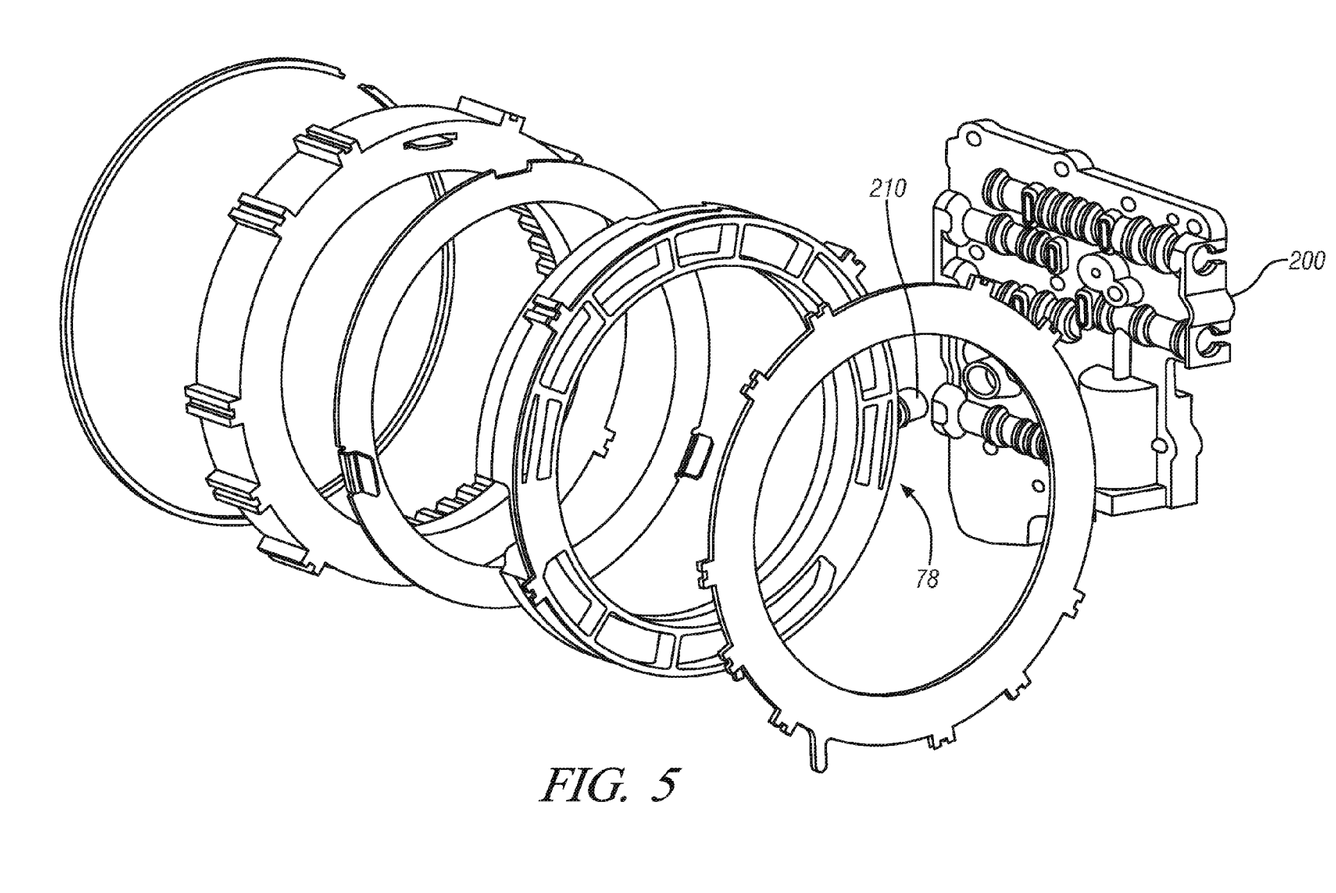
FIG. 5 is a disassembled view of alternative embodiment of the SOWC wherein a valve body is directly connected to the actuation mechanism for providing hydraulic fluid thereto, in accordance with the present disclosure.

FIG. 5 is an alternative embodiment wherein a valve body 200 is directly connected to the actuation mechanism 78 for providing hydraulic fluid thereto. Operation is similar as to that described above, however, the fluid channels and tubes to route the fluid to the actuation mechanism 78 are not necessary. A fluid feed tube 210 has a direct connection between the actuation mechanism 78 and the valve body 200 through the transmission housing. The fluid feed tube 210 can be an individual tube, e.g., similar to fluid feed tube 82 of FIG. 2, or can be unitary with the actuation mechanism 78 or the valve body 200.

It will be obvious to one of ordinary skill in the art that the above description, in certain embodiments, can permit operation of the SOWC 58 within a conventional transmission housing 60 without any significant modifications thereto.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus for controlling a selectable one-way clutch (SOWC) in an automatic transmission, comprising:
    a ring-shaped control housing located substantially concentrically to the SOWC;
    an actuation mechanism included within the ring-shaped control housing and effective to actuate a single selector plate configured to control the SOWC in one of a default position and an actuation position, the SOWC partially engaged when in the default position and the SOWC fully engaged when in the actuation position;
    the single selector plate located between the ring-shaped control housing and the SOWC;
    a return mechanism including a biasing member configured to act on the single selector plate at a position on the housing that is diametrically opposed to a position of the actuation mechanism;
    a hydraulic fluid delivery system hydraulically communicating with the actuation mechanism to act on the single selector plate in concert with the return mechanism;
    the single selector plate configured to control the SOWC in the default position when hydraulic pressure communicated to the actuation mechanism is less than a force of the biasing member and the single selector plate configured to control the SOWC in the actuation position when the hydraulic pressure communicated to the actuation mechanism is greater than the force of the biasing member;
    the default position effecting operation of the SOWC locked in a first rotational direction and freewheeling in a second rotational direction opposite the first rotational direction; and
    the actuation position effecting operation of the SOWC locked in the first rotational direction and locked in the second rotational direction.

2. The apparatus of claim 1, wherein the return mechanism is distally located from the actuation mechanism to act on the single selector plate in concert with the hydraulic fluid delivery system.

3. The apparatus of claim 2, wherein the return mechanism engages the single selector plate through a return member of the single selector plate.

4. The apparatus of claim 1, wherein the hydraulic fluid delivery system hydraulically communicating with the actuation mechanism comprises a fluid feed tube directly interconnecting the actuation mechanism with the hydraulic fluid delivery system.

5. The apparatus of claim 1, wherein the hydraulic fluid delivery system hydraulically communicating with the actuation mechanism comprises a fluid feed tube interconnecting the actuation mechanism with the hydraulic fluid delivery system delivering hydraulic fluid through a transmission housing.

6. The apparatus of claim 1, wherein the actuation mechanism engages the single selector plate through an actuation member of the single selector plate.

7. The apparatus of claim 1, wherein the single selector plate comprises an activation notch for accepting an actuation lever from the SOWC for operating the SOWC between the default position and the actuation position.

8. Method for controlling a selectable one-way clutch (SOWC) in an automatic transmission having a hydraulic fluid delivery system and a transmission housing, comprising:
    controlling the hydraulic fluid delivery system to provide hydraulic fluid to an actuation mechanism housed within a ring-shaped control housing to establish a single selector plate engaged with the SOWC in one of a default position and an actuation position, the SOWC partially engaged when in the default position and the SOWC fully engaged when in the actuation position, the controlling including hydraulically communicating with the actuation mechanism and including a biasing member acting on the single selector plate at a position on the housing that is diametrically opposed to a position of the actuation mechanism and in concert with a return mechanism;
    controlling the SOWC in the default position when hydraulic pressure communicated to the actuation mechanism is less than a force of the biasing member and controlling the SOWC in the actuation position when the hydraulic pressure communicated to the actuation mechanism is greater than the force of the biasing member;

wherein controlling the SOWC in the default position comprises operating the SOWC locked in a first rotational direction and freewheeling in a second rotational direction opposite the first rotational direction; and wherein controlling the SOWC in the actuation position comprises operating the SOWC locked in the first rotational direction and locked in the second rotational direction.

9. The method of claim 8, wherein controlling the hydraulic fluid delivery system to provide hydraulic fluid to the actuation mechanism comprises selectively pressurizing the actuation mechanism.

10. The method of claim 9, wherein selectively pressurizing the actuation mechanism extends an actuation piston acting upon the single selector plate.

11. The method of claim 8, further comprising returning the single selector plate from the actuation position to the default position with the return mechanism.

12. The method of claim 8, further comprising operating the SOWC in an automatic mode, comprising:
monitoring a vehicle speed; and
wherein controlling the hydraulic fluid delivery system comprises:
operating the single selector plate in the actuation position when the vehicle speed is less than a threshold speed; and
operating the single selector plate in the default position when the vehicle speed is greater than the threshold speed.

13. The method of claim 8, further comprising operating the SOWC in an automatic mode, comprising:
monitoring a vehicle gear selection; and
wherein controlling the hydraulic fluid delivery system comprises operating the single selector plate in the actuation position when the vehicle gear selection comprises a reverse mode.

14. The method of claim 8, further comprising operating the SOWC in a manual mode, comprising:
monitoring activation of an operator selectable input; and
wherein controlling the hydraulic fluid delivery system comprises operating the single selector plate in the actuation position based upon the activation of the operator selectable input.

\* \* \* \* \*